US 009596459 B2

(12) United States Patent
Keaffaber et al.

(10) Patent No.: US 9,596,459 B2
(45) Date of Patent: Mar. 14, 2017

(54) MULTI-TARGET CAMERA CALIBRATION

(71) Applicant: INTEL CORPORATION, Santa Clara, CA (US)

(72) Inventors: Todd Keaffaber, Lake Oswego, OR (US); Daniel Middleton, Independence, MN (US); Gilson Goncalves de Lima, Palo Alto, CA (US); Martin Meloun, Svinare-Halouny (CZ); Varun Nasery, Santa Clara, CA (US); Jianbo Shi, Philadelphia, PA (US); Kabeer Manchanda, San Jose, CA (US); Philip Kim, Santa Clara, CA (US); Christopher Bernard, Santa Clara, CA (US); Yedong Niu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 14/498,793

(22) Filed: Sep. 26, 2014

(65) Prior Publication Data

US 2016/0073101 A1    Mar. 10, 2016

Related U.S. Application Data

(60) Provisional application No. 62/046,787, filed on Sep. 5, 2014.

(51) Int. Cl.
H04N 9/47      (2006.01)
H04N 9/80      (2006.01)
(Continued)

(52) U.S. Cl.
CPC ......... *H04N 17/002* (2013.01); *G06T 7/0018* (2013.01); *H04N 5/2258* (2013.01);
(Continued)

(58) Field of Classification Search
CPC .. H04N 17/002; H04N 5/2258; G06T 7/0018; G06T 2207/30208; G06T 2207/10016
(Continued)

(56) References Cited

U.S. PATENT DOCUMENTS 6,137,893 A    10/2000   Michael et al.
8,619,144 B1   12/2013   Chang et al.
(Continued)

FOREIGN PATENT DOCUMENTS

CN    101236654 A    8/2008
CN    101505433 A    8/2009
(Continued)

OTHER PUBLICATIONS

International Search Report, PCT No. PCT/US2015/044027, mailed on Nov. 19, 2015, 3 pages.
(Continued)

*Primary Examiner* — Robert Chevalier
(74) *Attorney, Agent, or Firm* — International IP Law Group, P.L.L.C.

(57) ABSTRACT

Techniques for calibration of image capturing devices are described herein. The techniques include capturing one or more images at a first target, capturing one or more images at a second target, capturing one or more images at a third target, capturing one or more images at a fourth target, and calibrating a multi-camera system based on the captured images.

22 Claims, 23 Drawing Sheets

(51) Int. Cl.
*H04N 17/00* (2006.01)
*G06T 7/00* (2006.01)
*H04N 5/225* (2006.01)

(52) U.S. Cl.
CPC ............... *G06T 2207/10016* (2013.01); *G06T 2207/30208* (2013.01)

(58) Field of Classification Search
USPC ............... 386/200, 210, 223, 227, 230, 242; 348/61, 92, 94, 95
See application file for complete search history.

(56) References Cited

U.S. PATENT DOCUMENTS

| | | |
|---|---|---|
| 2008/0231710 A1 | 9/2008 | Asari et al. |
| 2011/0157373 A1 | 6/2011 | Ye et al. |
| 2012/0154586 A1 | 6/2012 | Chung et al. |
| 2012/0287240 A1 | 11/2012 | Grossmann et al. |
| 2014/0247354 A1* | 9/2014 | Knudsen ................. B60R 1/00 348/148 |

FOREIGN PATENT DOCUMENTS

| | | |
|---|---|---|
| EP | 2571261 A1 | 3/2013 |
| JP | 2014064224 A | 4/2014 |
| TW | 201226237 A | 7/2012 |

OTHER PUBLICATIONS

Taiwan IPO Search Report, Taiwan Patent No. 104125103, mailed on Mar. 22, 2016, 2 pages.
Zhang, Zhengyou, "A Flexible New Technique for Camera Calibration", IEEE Transactions on Pattern Analysis and Machine Intelligence, vol. 22, No. 11, Nov. 2000, pp. 1330-1334.

* cited by examiner

200

300

400

500

600

700

716

718

900

1000

1100

1200

1300

1400

1500

MULTI-TARGET CAMERA CALIBRATION

CROSS REFERENCE TO RELATED APPLICATIONS

The present application claims the benefit of the filing date of U.S. Provisional Patent Application No. 62/046,787, filed Sep. 5, 2014, which is incorporated herein by reference.

TECHNICAL FIELD

This disclosure relates generally to camera calibration. More specifically, the disclosure describes a multi-target calibration process.

BACKGROUND

Mobile devices, such as tablets, smartphones, and the like may include numerous devices such as cameras for capturing imagines. In many cases, tablets require calibration of camera system tolerances, such as shifting, noise, and other image quality factors. In some cases, a mobile device may include multiple cameras configured to work individually or in concert. Mobile devices having multi-camera systems may present difficulty during calibration.

Multi-camera calibration techniques require capturing many images of a calibration target at different angels and distances from the cameras of a given multi-camera system. However, the physical space and time required to calibrate during high-volume manufacturing may increase cost of production.

DETAILED DESCRIPTION

The subject matter disclosed herein relates to techniques for calibration of a multi-camera system. As discussed above, calibration is important for the correct functioning of cameras, and other image capture devices. However, many techniques require long periods of time to complete during which multiple images of the same target are captured. The techniques described herein include calibration of a multi-camera system using multiple targets may reduce the number of images required to calibrate the camera systems, and thereby reducing the time required for calibration.

In some cases, the techniques described herein may be implemented as computer-readable code that is executable by a processing device. The techniques described herein may be integrated into a factory assembly facility. In embodiments, the techniques described herein may reduce a required number of images for calibration of a multi-camera system. A reduction in the number of images required for calibration may enable implementation of the calibration techniques described herein in a high-volume manufacturing environment.

Figure 1:
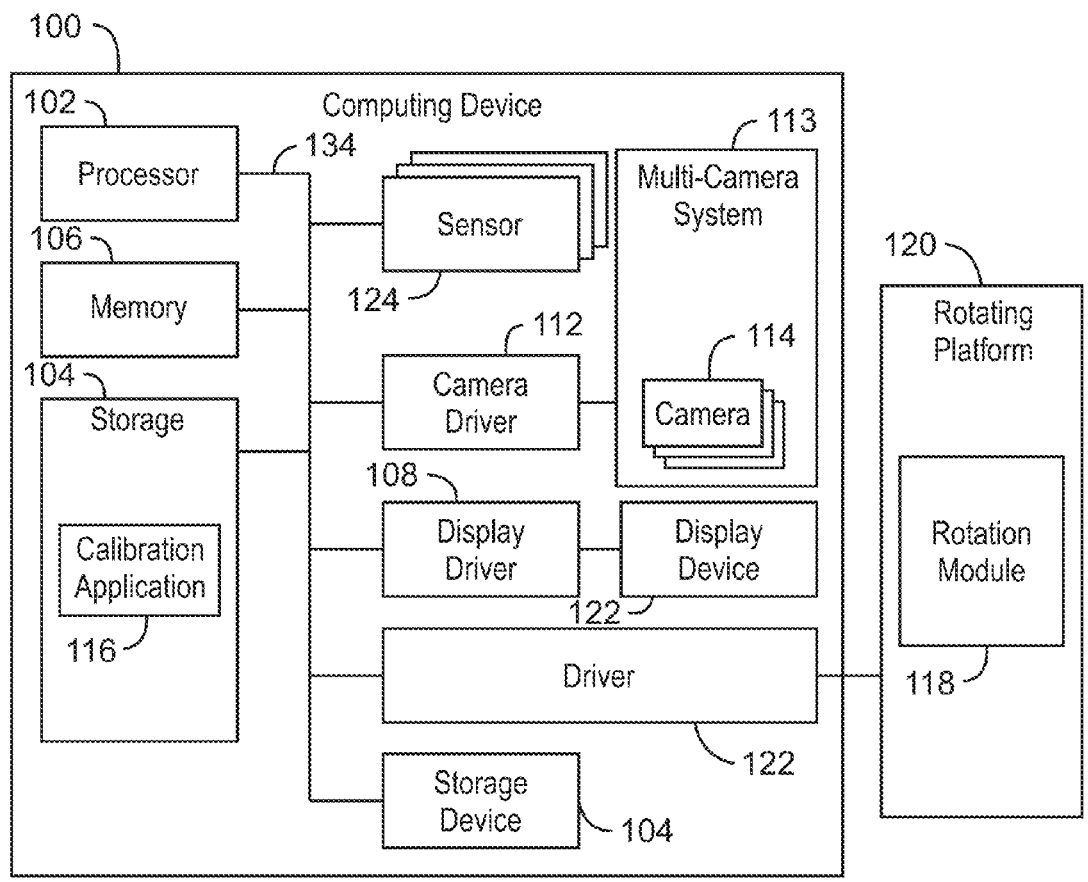
FIG. 1 is a block diagram of a computing device having a multi-camera system to be calibrated.

FIG. 1 is a block diagram of a computing device having a multi-camera system to be calibrated. The computing device 100 may include a processor 102, a storage device 104 including a non-transitory computer-readable medium, and a memory device 106. The computing device 100 may include a display driver 108 configured to operate a display device 110 to render images at a graphical user interface (GUI), a camera driver 112 configured to operate a multi-camera system 113 including one or more camera devices 114.

The computing device 100 includes calibration application 116. The calibration application 116 may be configured to calibrate the multi-camera system 113. In examples, the calibration application 116 is used to calibrate the multi-camera system 113. The calibration application 116 may be instructions stored on a storage medium configured to be carried out by a processing device, such as the processor 102. In yet other examples, the calibration application 116 may be configured to operate in conjunction with rotation module 118 of a rotation platform 120 via a driver 122. As described in more detail below, the rotation platform 120 may rotated to capture images at different positions associated with multiple targets. In some cases, the calibration application 116 and the rotation module 118 may be configured as uniform program operating on either the computing device 100 or the rotating platform 120. In the latter case, the rotating platform 120 may include logic, or software instructions and a processing device to carry out instructions including rotating the computing device 100 and capturing images in conjunction with the multi-camera system 113, as well as logic, and or software configured to carry out the operations of the calibration application 116.

The rotation module 118, and the calibration application 116, may be considered separate modules or sub-modules of a parent module, or individual applications. Additional modules and/or applications may also be included. In some scenarios, the computing device 100 may include one or more sensors 124. In these scenarios, the one or more sensors 124 may be used to detect potential conditions causing error in an image capture during calibration. For example, the sensors 124 may include a gyrometer configured to determine when the computing device is not level, thereby creating a potential error in capturing images during the calibration process described in more detail below. As another example, an ambient light sensor may be used to determine whether a foreign object is occluding the field of view between a given camera and a given target.

As discussed in more detail below, the calibration of the camera devices 114 is provided by capturing images at more than one target. The rotating platform 120 may be configured to rotate to different positions associated the multiple targets. The rotation may be automatic, or may involve some level of human input. For example, an operator may be required to initiate the calibration process and continue to press a button on the rotating platform 120 after each image is captured. Further, although the image capture may also be automated, the operator may be useful to press a shutter button associated with the camera devices 114 in order to capture a given image at a given position and for a given target.

The computing device 100, as referred to herein, may be a mobile computing device wherein components such as a processing device, a storage device, and a display device are disposed within a single housing. For example, the computing device 100 may be a tablet computer, a smartphone, a handheld videogame system, a cellular phone, an all-in-one slate computing device, or any computing device having all-in-one functionality wherein the housing of the computing device houses the display was well as components such as storage components and processing components.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The main processor 102 may be connected through a system bus 134 (e.g., Peripheral Component Interconnect (PCI), Industry Standard Architecture (ISA), PCI-Express, HyperTransport®, NuBus, etc.) to components including the memory 106 and the storage device 104.

The display driver 108 may be a point of interaction with software or hardware of the computing device 100 and the display device 110. For example, the display driver 108 may include an interface such as a digital video interface (DVI), a high-definition multimedia interface (HDMI), and the like. The display device 110 may be a built-in display, or a peripheral display of the computing device 100. In embodiments, the display device 110 includes touch-screen functionality.

The camera driver 112 is configured to direct the one or more camera devices 114 to capture visual information, or in other words, images of an image set that are to be used to calibrate the multi-camera system 113. The camera devices 114 may be a video camera configured to capture real-time video, a depth camera, an infrared camera, and the like.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
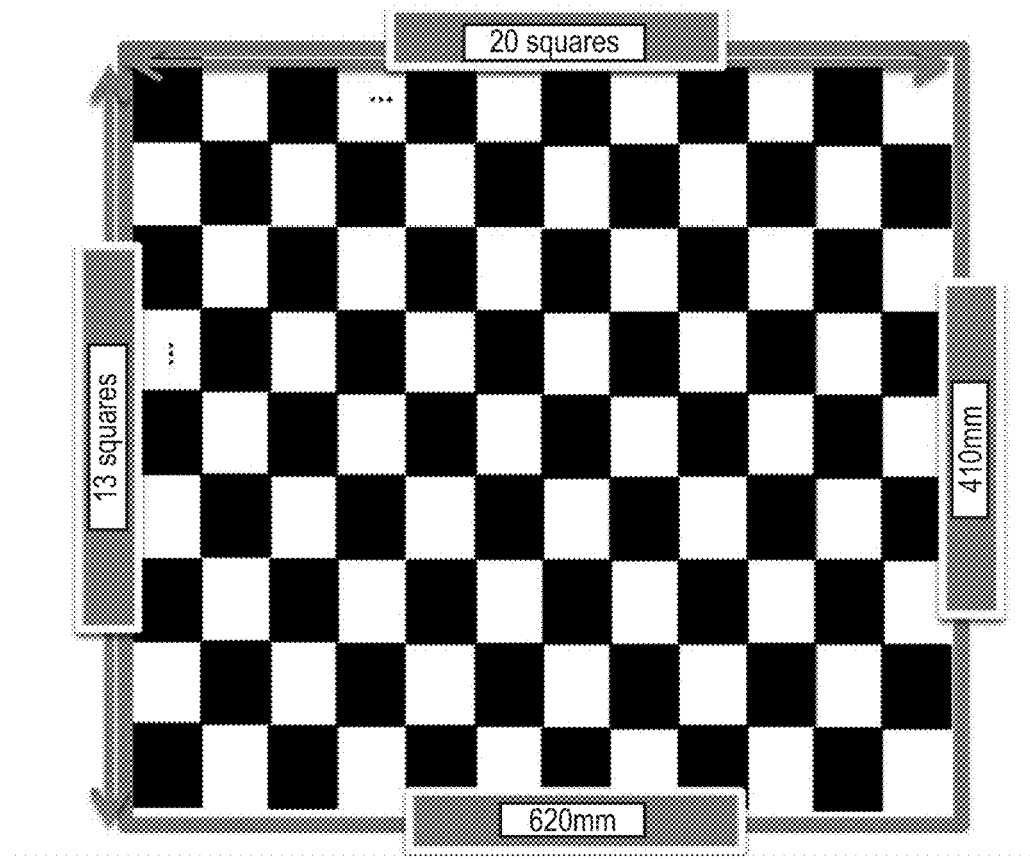
FIG. 2 is a diagram illustrating a first target to be used in calibration.

FIG. 2 is a diagram illustrating a first target to be used in calibration. The first target 200 may have dimensions of about 410 millimeters (mm) by about 620 mm. As illustrated in FIG. 2, the first target 200 may have a checkerboard pattern including multiple black and white squares. The square size of the first target may be about 30 mm by about 30 mm. In total, the first target 200 may include 20 squares by 13 squares. A border of about 10 mm may surround the checkerboard of the first target 200. In some scenarios, the first target 200 may be configured to be disposed at about 889 mm above ground.

Figure 3:
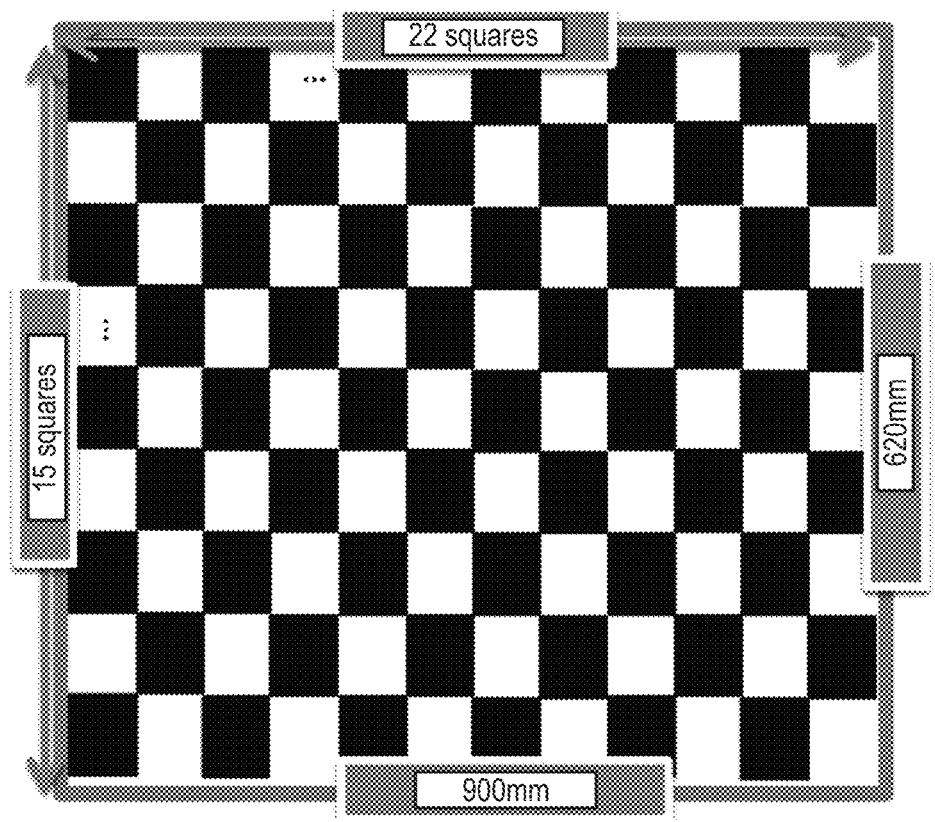
FIG. 3 is a diagram illustrating a second target to be used in calibration.

FIG. 3 is a diagram illustrating a second target to be used in calibration. The second target 300 includes a square size of about 40 mm by 40 mm, having 22 squares by 15 squares, and the dimensions of the second target 300 are about 620 mm by 900 mm. Similar to the first target 200, the second target 300 includes a border of about 10 mm.

Figure 4:
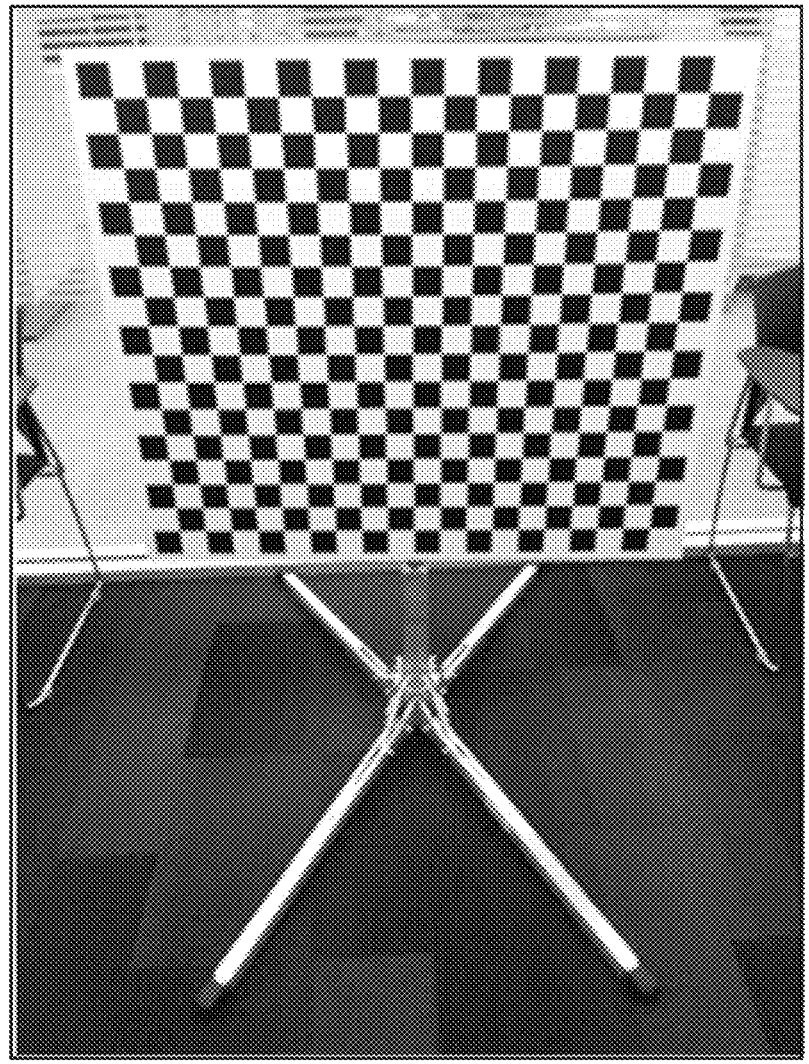
FIG. 4 is a diagram illustrating a target held by a stand.

FIG. 4 is a diagram illustrating a target held by a stand. As discussed above, the first target may be disposed at about 889 mm above ground. This height is given as one example. However, what is important is that the first target 200 and even the second target 300 are disposed at the same height as the multi-camera system 113.

In embodiments, the targets described herein may be made of a stiff material that will ensure that the targets do not warp or bend. In other words, the targets described herein are flat.

Figure 5:
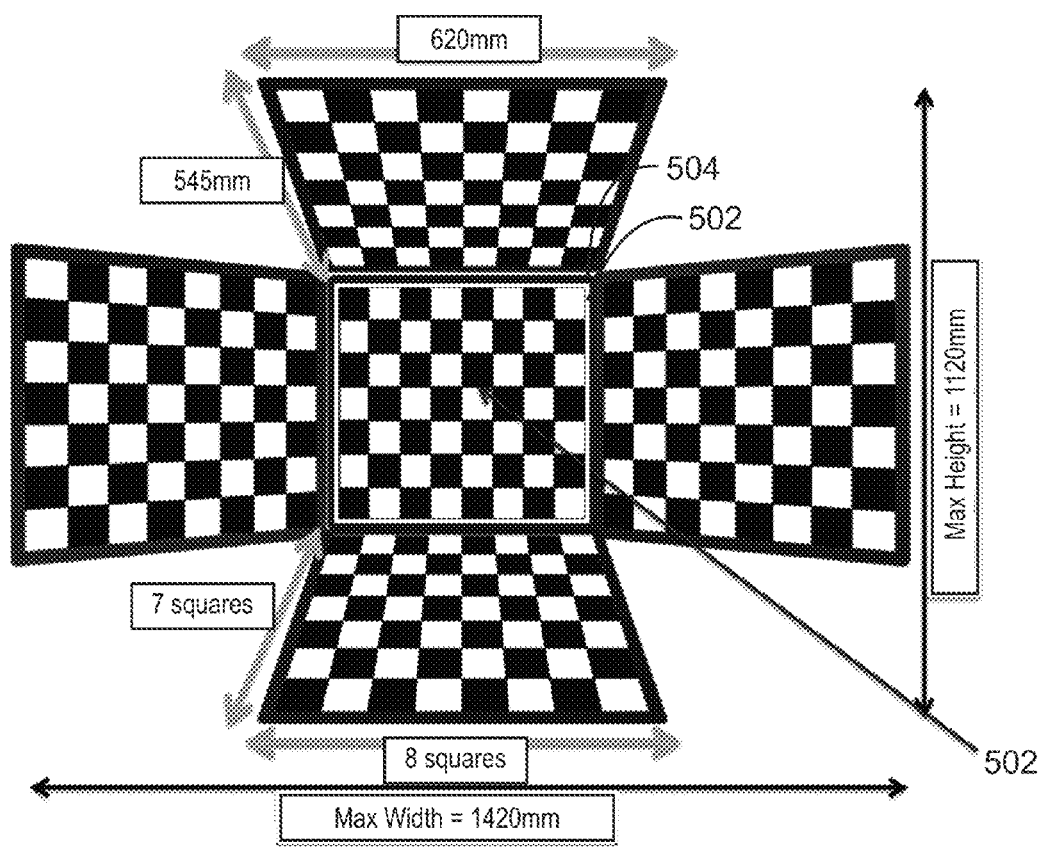
FIG. 5 is a diagram illustrating a multi-board target to be used in calibration.

FIG. 5 is a diagram illustrating a multi-board target to be used in calibration. As illustrated in FIG. 5, the multi-board target 500 includes five separate checkerboards disposed at about a 40 degree angle from one another. Each of the five separate checkerboards may have dimensions of about 620 mm by 545 mm, or 7 squares by 8 squares, wherein each square is about 60 mm by 60 mm. The multi-board target 500 design may be used for each of the third target and fourth target. Although not illustrated at all checkerboards in FIG. 5, the multi-board target 500 may include a red border 502 and a white border 504 around the perimeter of each individual board. Similar to the first target 200 and the second target 300, a center 506 multi-board target 500 may be disposed at a height that is level with the multi-camera system.

Figure 6A:
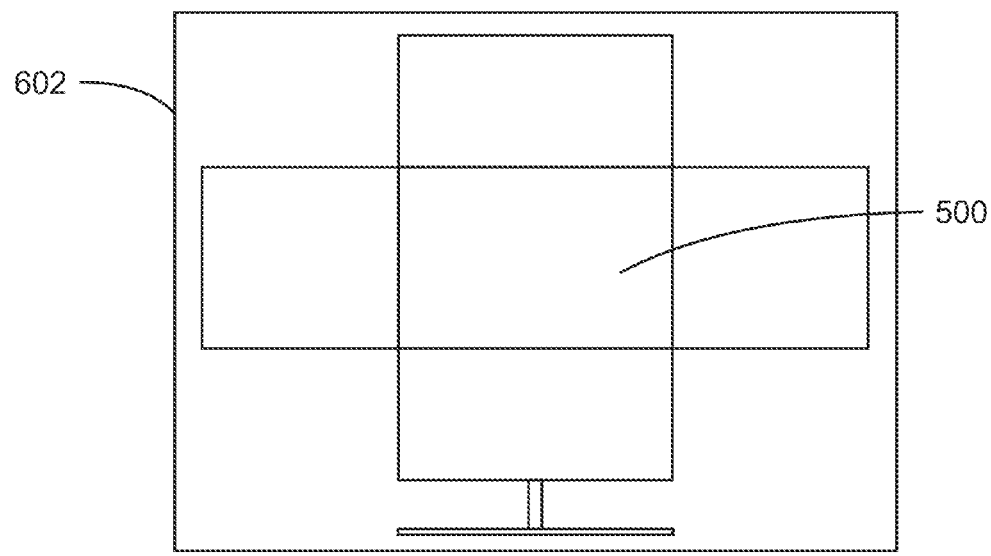
FIG. 6A is a diagram illustrating different views of a multi-board target.
Figure 6A:
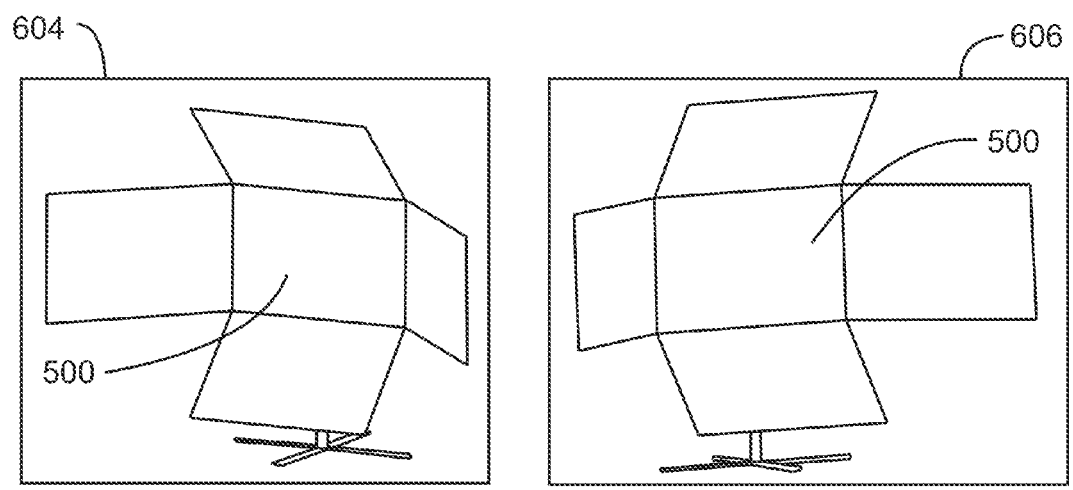

FIG. 6A is a diagram illustrating different views of a multi-board target. At 602, a front view of the multi-board target 500 is illustrated. Note that each of the faces of the multi-board target 500 will have a checkerboard design, such as the checkerboard design illustrated in FIG. 5. Each of the views 604 and 606 illustrate side views of the multi-board target 500 of FIG. 5.

Figure 6B:
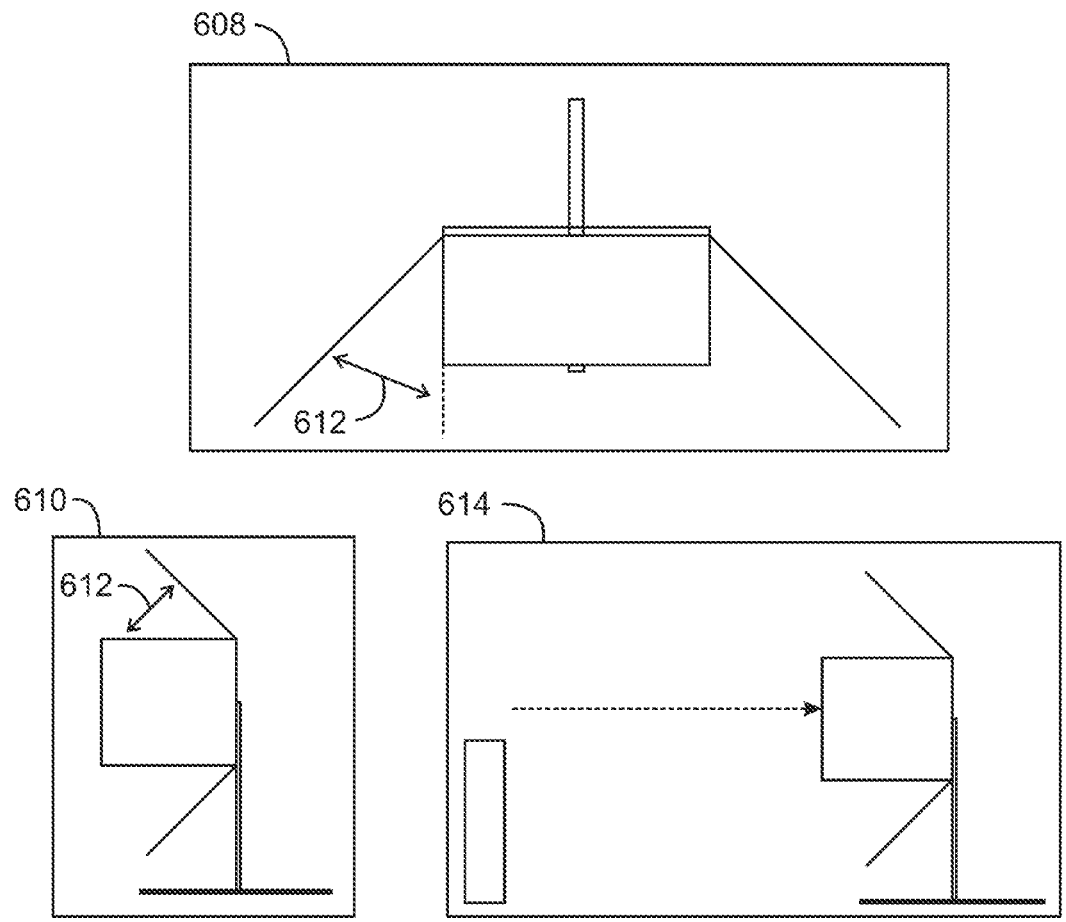
FIG. 6B is a diagram illustrating additional views of a multi-board target.

FIG. 6B is a diagram illustrating additional views of a multi-board target. As illustrated in 608 and 610, an angle 612 between each of the individual boards may be the same. In one example, the angle 612 is about 40 degrees. In some scenarios, a height of the multi-board target may be 90 centimeters (cm) to a center of the multi-board target as illustrated at 610. An indicated at 614, a multi-camera system, such as the multi-camera system 113 of FIG. 1, may be disposed in front of a multi-board target in each of the scenarios wherein the third target and the fourth target are used, as discussed in more detail below.

Figure 7A:
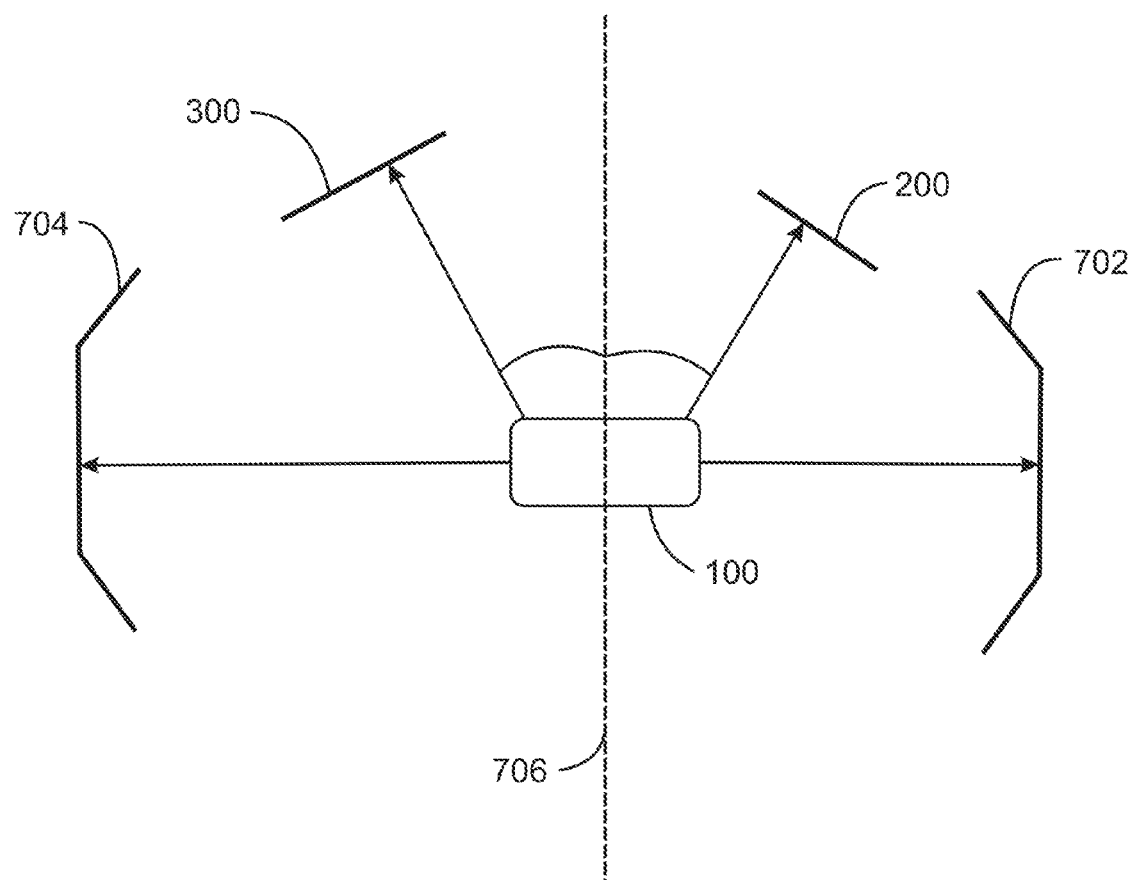
FIG. 7A is a diagram illustrating an environment including 4 different targets used in calibration.

FIG. 7A is a diagram illustrating an environment including 4 different targets used in calibration. The environment 700 includes the first target 200, the second target 300, and multi-board targets for each of a third target 702 and a fourth target 704. For ease discussion, the numerals assigned to each of the targets may be followed below. A computing device, such as the computing device 100 having a multi-camera system 113 discussed above in regard to FIG. 1, may be positioned with targets at least partially sounding the computing device 100. Although not illustrated in FIG. 7A, the computing device 100 may be placed on a rotating platform, such as the rotating platform 120, discussed above in regard to FIG. 1. As described in more detail below, the computing device 100 may be rotated by the rotating platform to capture images of each target.

As illustrated in FIG. 7A, an initial disposition of the target 200 and the target 300 may be 45 degrees from a center line indicated at 706. In embodiments, the distance from the computing device 100 to the target 200 is about 800 mm, and the distance from the computing device 100 to the target 300 is about 1200 mm. The target 702 may be disposed at a distance of 2230 mm from the computing device 100, while the target 704 is disposed at a distance of 3050 mm from the computing device 100.

Figure 7B:
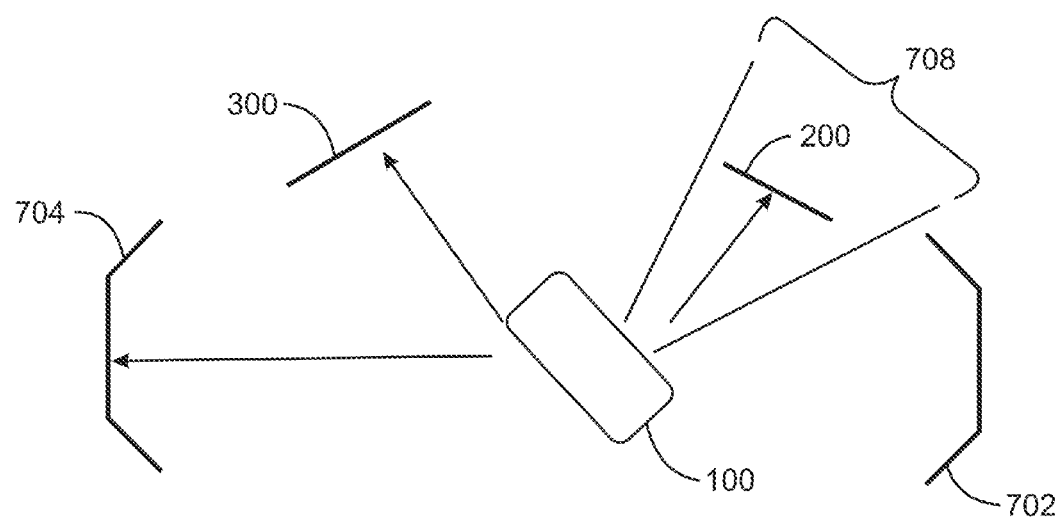
FIG. 7B is a diagram illustrating an environment including a first position associated with the first target.

FIG. 7B is a diagram illustrating an environment including a first position associated with the first target. At a first position 710 illustrated in FIG. 7B, the multi-camera system 114 captures a first image at the first target 200. The target 200 is centered in a field of view of the multi-camera system 114, as indicated at 708. The entire target 200 may be within the field of view 708, and equal space above and below the target may appear the field of view 708.

Figure 7C:
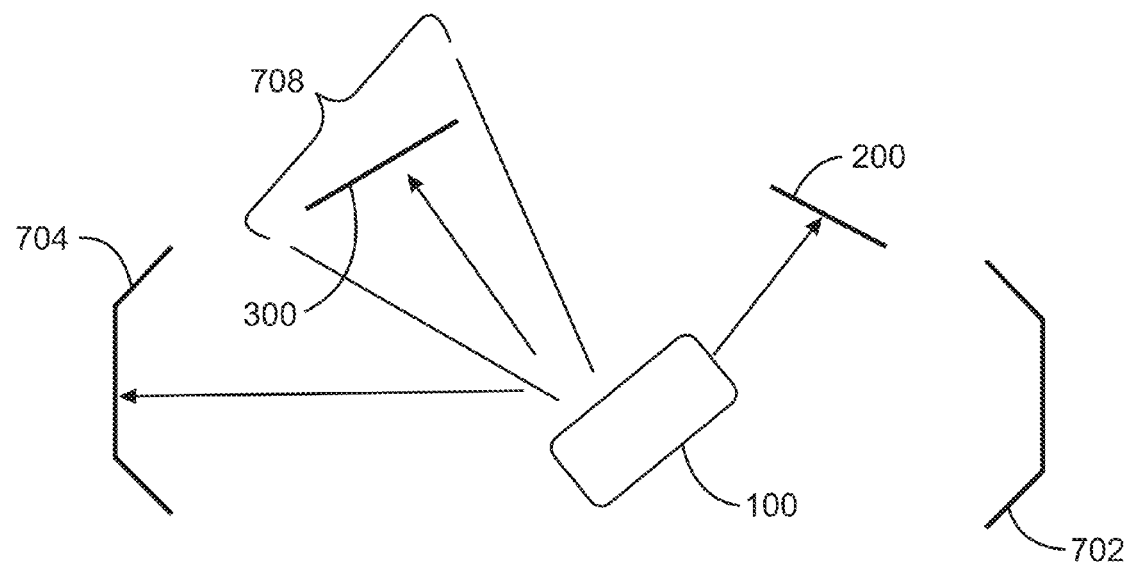
FIG. 7C is a diagram illustrating an environment including a second position associated with the second target.

FIG. 7C is a diagram illustrating an environment including a second position associated with the second target. At a second position 712 illustrated in FIG. 7C, the multi-camera system 113 of the tablet captures a second image at the second target 300. In embodiments, the computing device 100 is rotated about 90 degrees from the first position 710 to the second position 712. The entire target 300 may be within the field of view 708, and equal space above and below the target may appear the field of view 708.

Figure 7D:
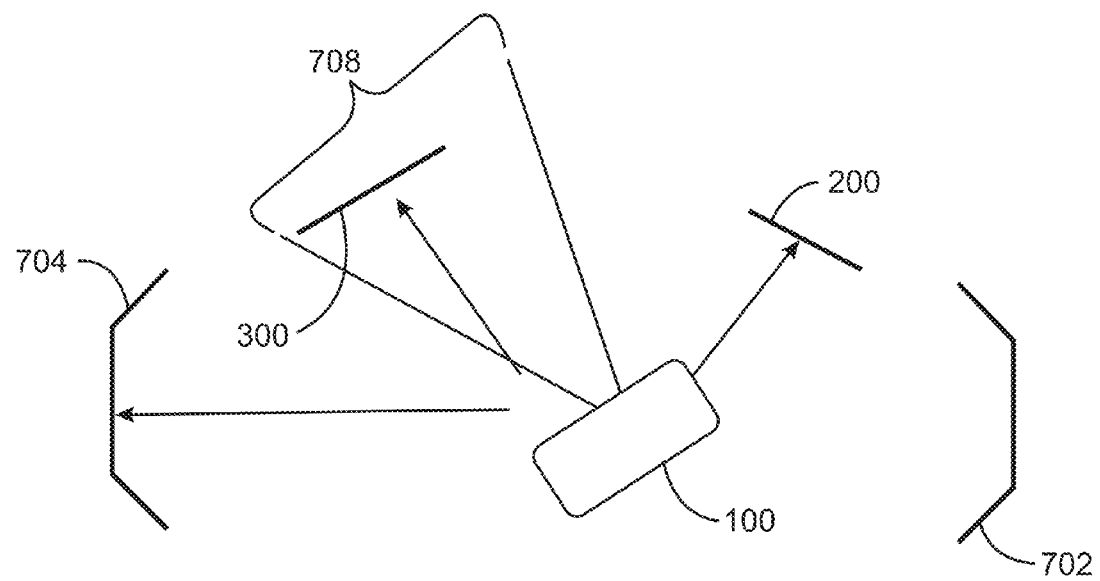
FIG. 7D is a diagram illustrating an environment including a third position associated with the second target.

FIG. 7D is a diagram illustrating an environment including a third position associated with the second target. At a third position 714 illustrated in FIG. 7D, the multi-camera system 113 captures a third image at the second target 300. In this scenario, there are two images captured of the second target 300—one at the second position 712 of FIG. 7C, and one at the third position 714 in FIG. 7D. The difference between the second 712 and third positions 714 may be a rotation of the computing device 100 of about 10 degrees. The entire target 300 may be within the field of view 708 and equal space above and below the target may appear the field of view 708.

Figure 7E:
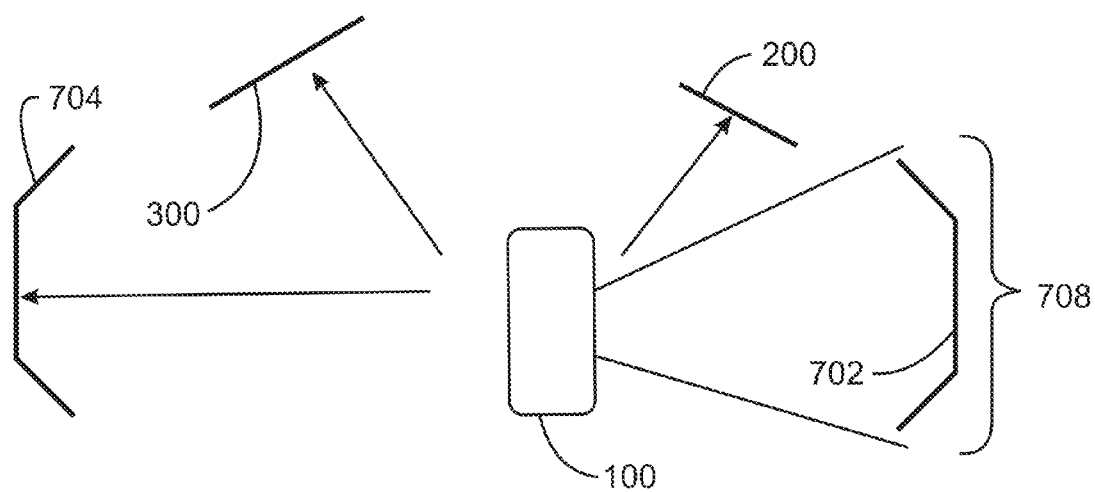
FIG. 7E is a diagram illustrating an environment including a fourth position associated with the third target.

FIG. 7E is a diagram illustrating an environment including a fourth position associated with the third target. At a fourth position 716 illustrated in FIG. 7E, the multi-camera system 113 captures a fourth image at the third target 702. The difference between the third position 714 and the fourth position 714 may be a rotation of the computing device 100 of about 135 degrees. The entire target 702 may be within the field of view 708 and equal space above and below the target may appear the field of view 708.

Figure 7F:
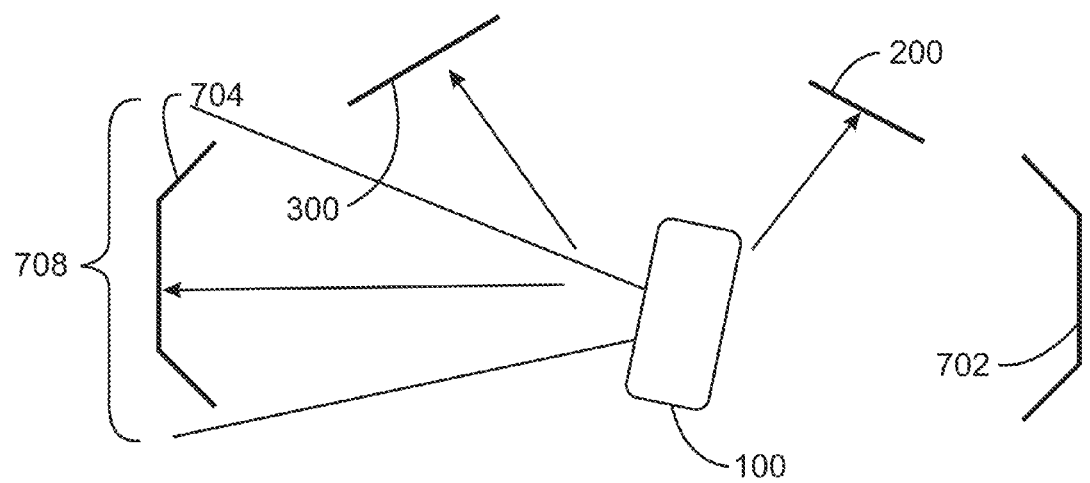
FIG. 7F is a diagram illustrating an environment including a fifth position associated with the fourth target.

FIG. 7F is a diagram illustrating an environment including a fifth position associated with the fourth target. At a fifth position 718 illustrated in FIG. 7F, the multi-camera system 113 captures a fifth image at the fourth target 704. The difference between the fourth position 716 and the fifth position 718 may be a rotation of the computing device 100 of about 180 degrees. The entire target 704 may be within the field of view 708 and equal space above and below the target may appear the field of view 708.

Figure 7G:
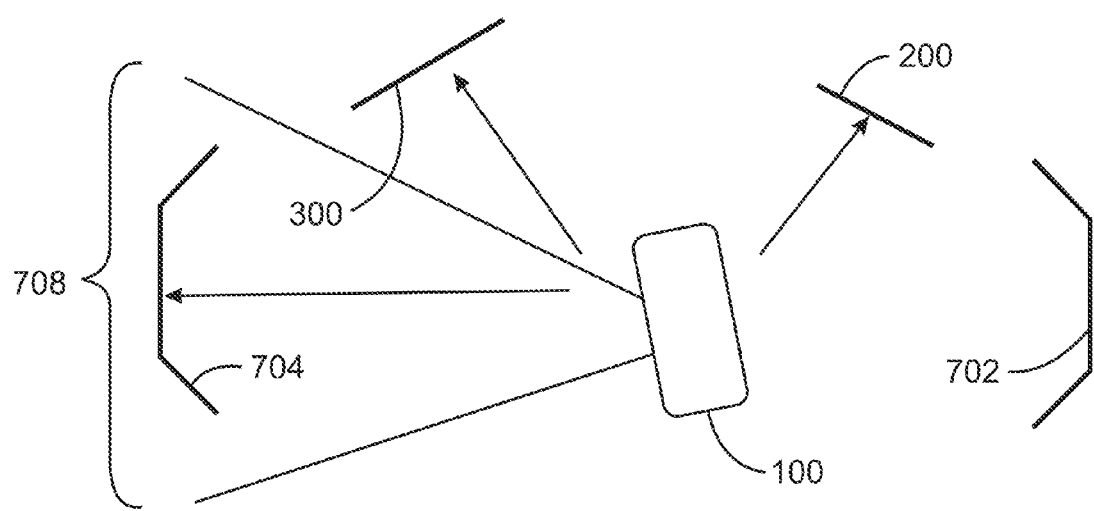
FIG. 7G is a diagram illustrating an environment including a sixth position associated with the fourth target.

FIG. 7G is a diagram illustrating an environment including a sixth position associated with the fourth target. At a sixth position 720 illustrated in FIG. 7F, the multi-camera system 113 captures a sixth image at the fourth target 704. The difference between the fifth position 718 and the sixth position 720 may be a rotation of the computing device 100 of about 10 degrees. The entire target 704 may be within the field of view 708 and equal space above and below the target may appear the field of view 708. In this scenario, there are two images captured of the fourth target 704—one at the fifth position 718 of FIG. 7F, and one at the sixth position 720 in FIG. 7G. The difference between the fifth and sixth positions may be a rotation of about 10 degrees.

Figure 8:
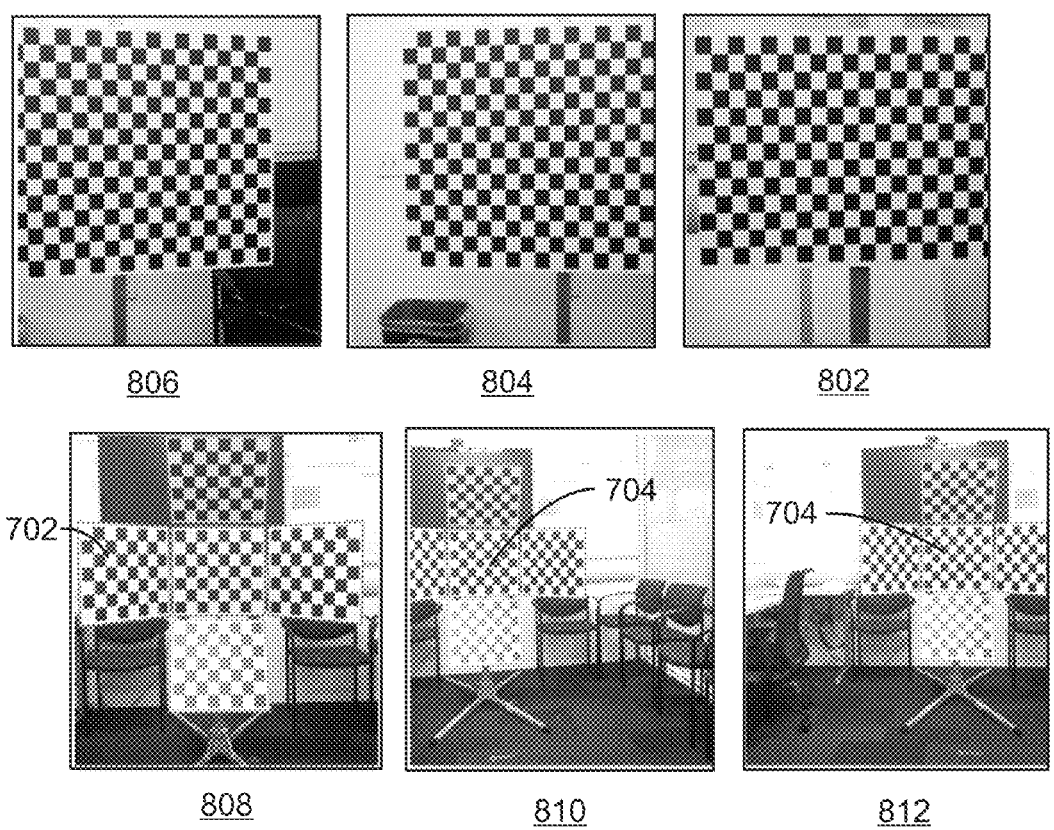
FIG. 8 is a diagram illustrating six images captured at different positions relative to the targets.

FIG. 8 is a diagram illustrating six images captured at different positions relative to the targets. As illustrated in FIG. 8, there is one image 802 of the first target 200, two images 804, 806 of the second target 300, one image 808 of the third target 702, and two images 810, 812 of the fourth target 704. Further, as illustrated in FIG. 8, the third target 702 and fourth target 704 are multi-board targets configured with a white border and a red border. When capturing images of either the third target or the fourth target, one checkerboard may be captured at a time. Therefore, the techniques described herein include stitching together the each checkerboard of the multi-board target together by identifying individual boards by their location relative to other boards. In other words, each checkerboard of a multi-board target may be captured individually, and subsequently suppressed while other checkerboards are captured. Then, checkerboard images may be stitched together for calibration based on their relative positions.

Figure 9:
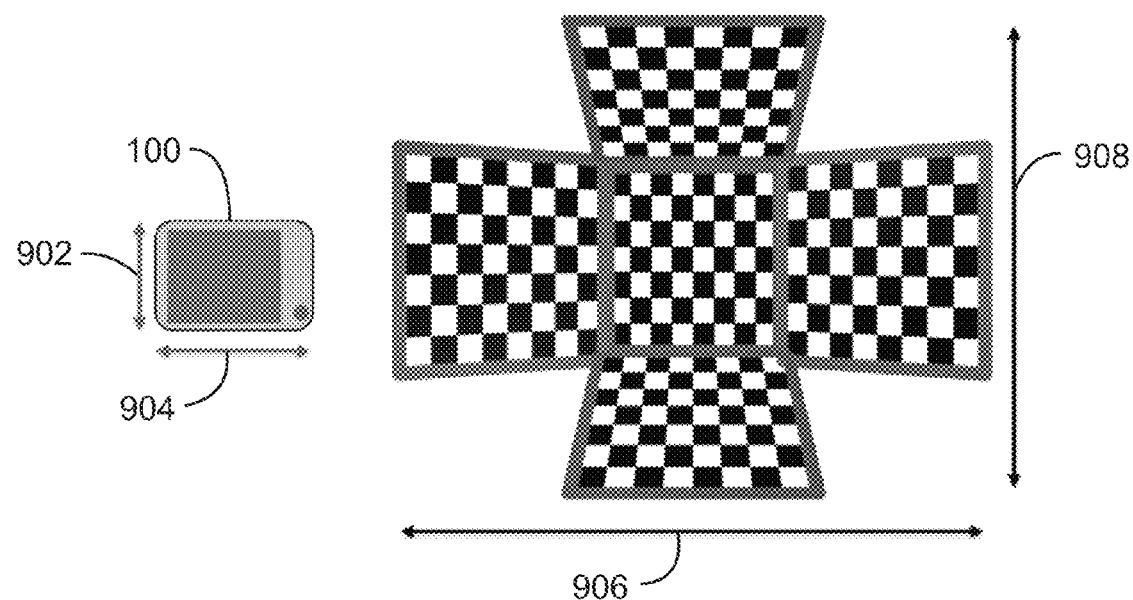
FIG. 9 is a diagram illustrating an orientation of a computing device having a multi-camera system in relationship to a target.

FIG. 9 is a diagram illustrating an orientation of a computing device having a multi-camera system in relationship to a target. In some scenarios, a computing device, such as the computing device 100 having a multi-camera system 113 may have a short axis 902 and a long axis 904. In this scenario, the long axis 904 of the computing device 100 is placed in the same orientation as a long axis 906 of a target, as illustrated in FIG. 9. Similarly, the short axis 902 of the computing device 100 is placed in the same orientation as a short axis 908 of a target.

Figure 10:
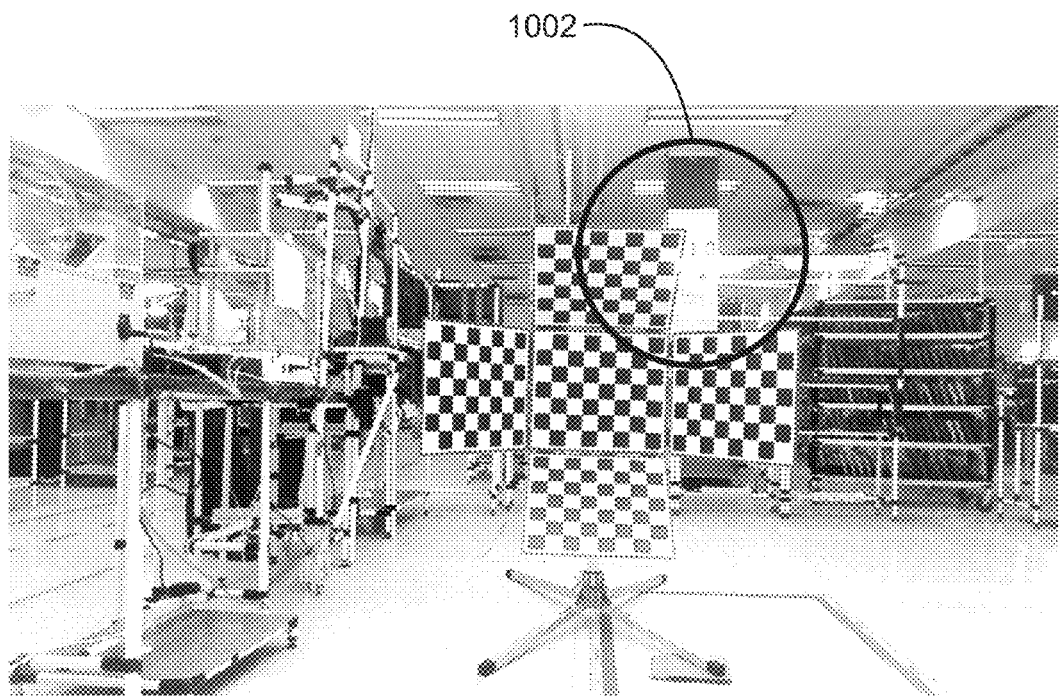
FIG. 10 is a diagram illustrating adverse effects of lighting in calibration.

FIG. 10 is a diagram illustrating adverse effects of lighting in calibration. In some scenarios, excessive lighting, or insufficient lighting may affect the calibration success or failure. As indicated in FIG. 10, the lighting at 1002 may adversely affect the calibration process. In some embodiments, lighting illuminates the targets with about 800 lux of light intensity limit. Further, bright lights positioned behind the targets facing the camera may be removed to reduce oversaturation.

Figure 11:
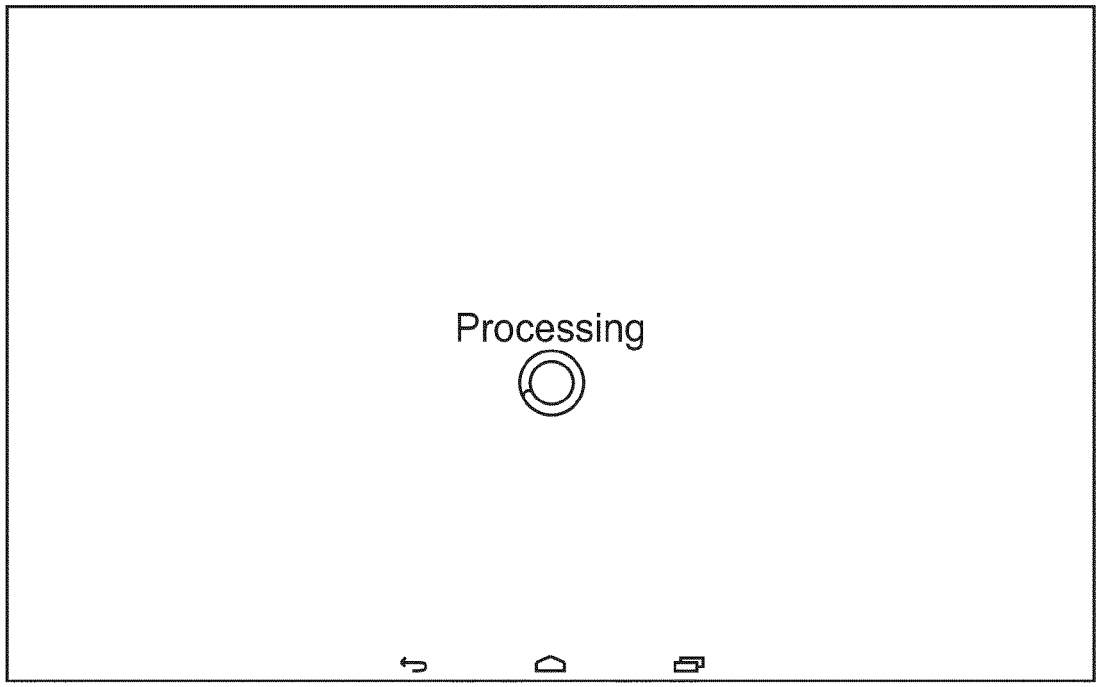
FIG. 11 is a diagram illustrating a graphical user interface to be rendered at the display of the computing device.

FIG. 11 is a diagram illustrating a graphical user interface to be rendered at the display of the computing device. After the images have been captured, the computing device 100 may begin processing the calibration. This may be rendered to an operator via graphical user interface 1100.

Figure 12:
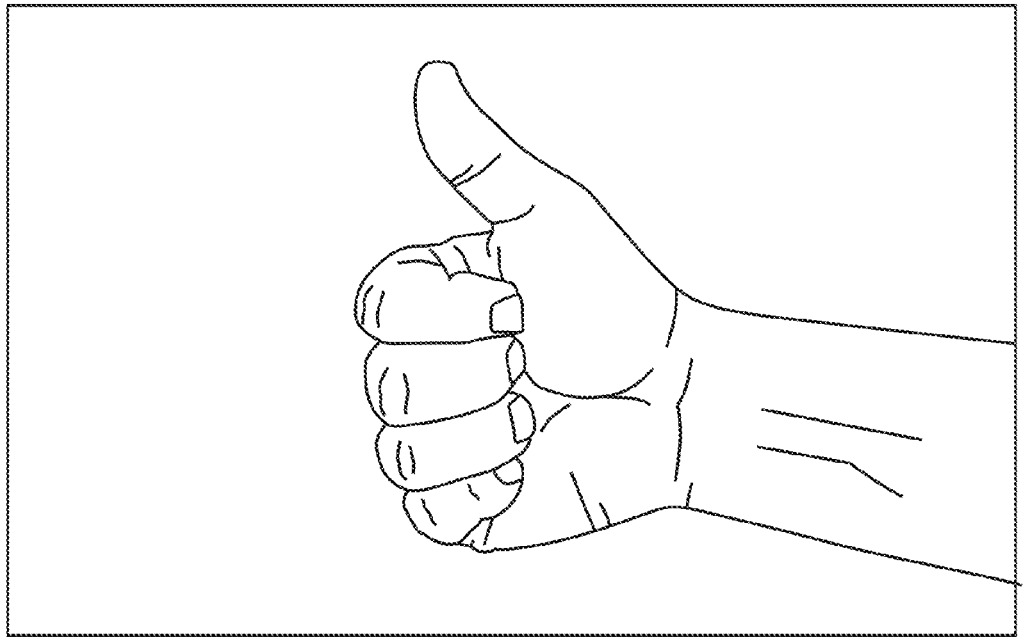
FIG. 12 is a diagram illustrating a graphical user interface to render a validation screen upon successful calibration.

FIG. 12 is a diagram illustrating a graphical user interface to render a validation screen upon successful calibration. If the calibration is successful, a graphical user interface 1200 may be rendered.

Figure 13:
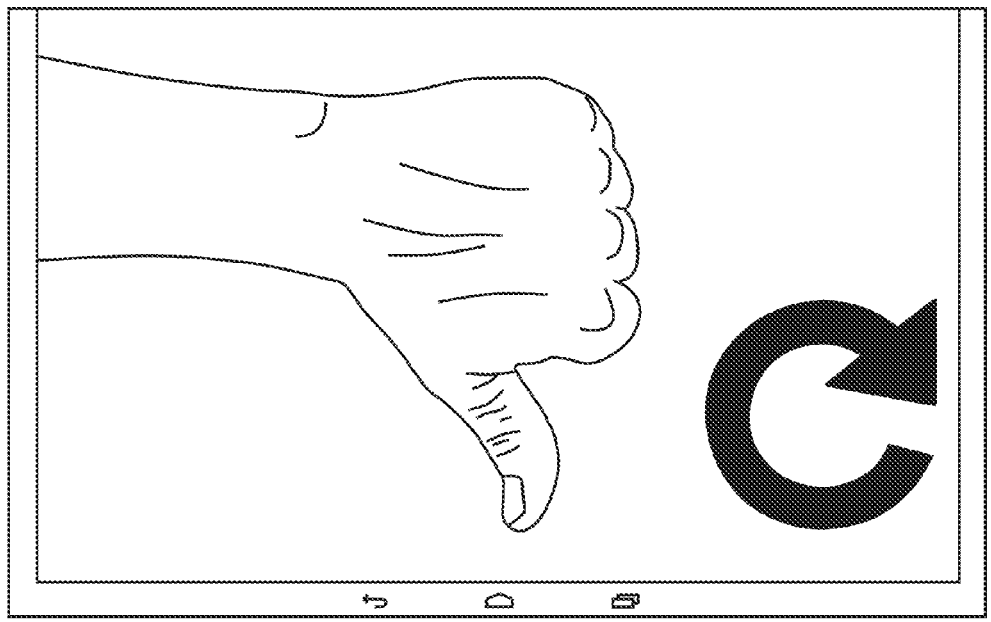
FIG. 13 is a diagram illustrating a graphical user interface to render a fail screen upon failure of calibration.

FIG. 13 is a diagram illustrating a graphical user interface to render a fail screen upon failure of calibration. If the calibration is unsuccessful, a graphical user interface 1300 may be rendered, and pressing a circular arrow may restart the process.

Figure 14:
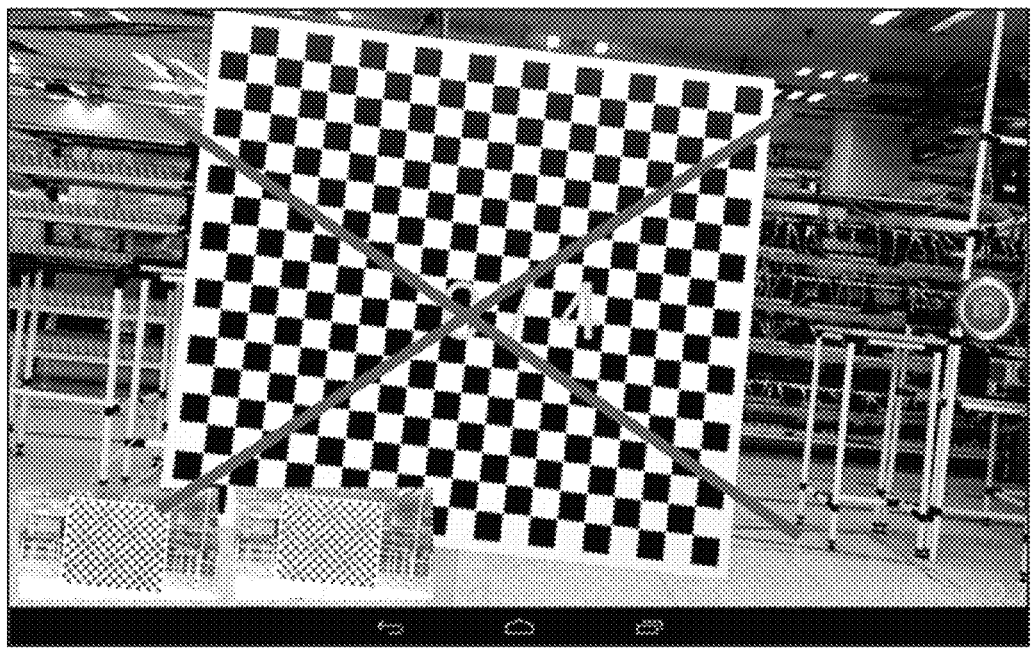
FIG. 14 is a graphical user interface illustrating an example of a factor causing calibration to fail.

FIG. 14 is a graphical user interface illustrating an example of a factor causing calibration to fail. In some scenarios, a calibration may fail due to a known error. An application, such as the calibration application 116 may render a failed image at a graphical user interface. As discussed above, a sensor, such as a sensor 124 of FIG. 1, may include a gyrometer to indicate that an image was captured when the device was not level. In this case, the calibration application 116 may stop the process and render a message to the operator that a given image is unusable, as indicated at 1400.

Figure 15:
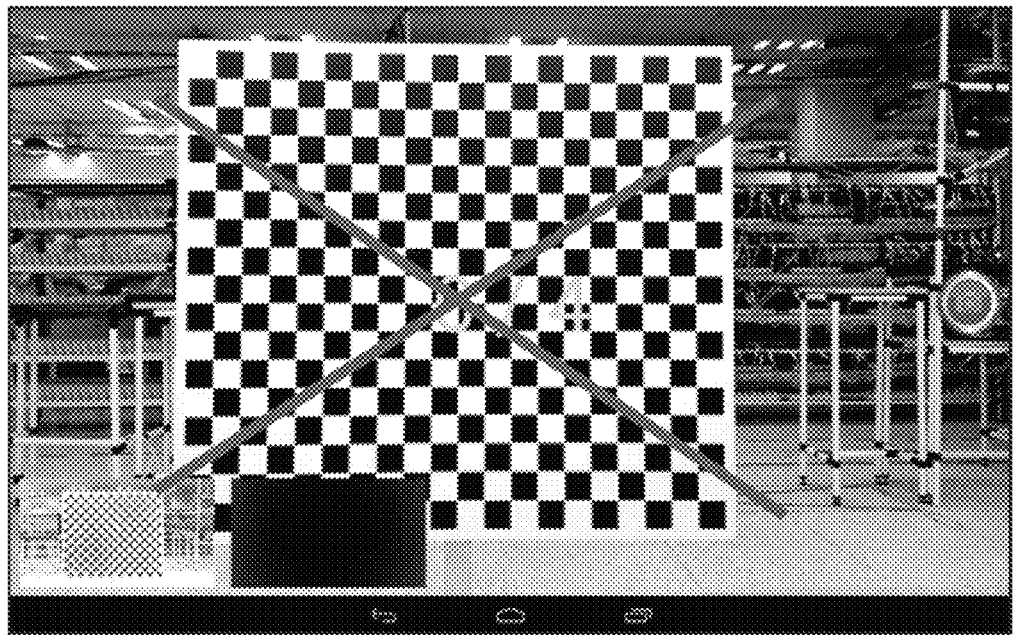
FIG. 15 is a graphical user interface illustrating an example of another factor causing calibration to fail.

FIG. 15 is a graphical user interface illustrating an example of another factor causing calibration to fail. Another factor causing failure may include an occluded camera device, such as one of the camera devices 114. In this scenario, the calibration application 116 may notify the operator of an unusable image as illustrated in FIG. 15. The detection of an occluded image may, in some scenarios, be performed via sensor 124 including an ambient light sensor, as discussed above in regard to FIG. 1. In this scenario, the calibration application 116 may stop the process and render a message to the operator that a given image is unusable, as indicated at 1500.

Figure 16:
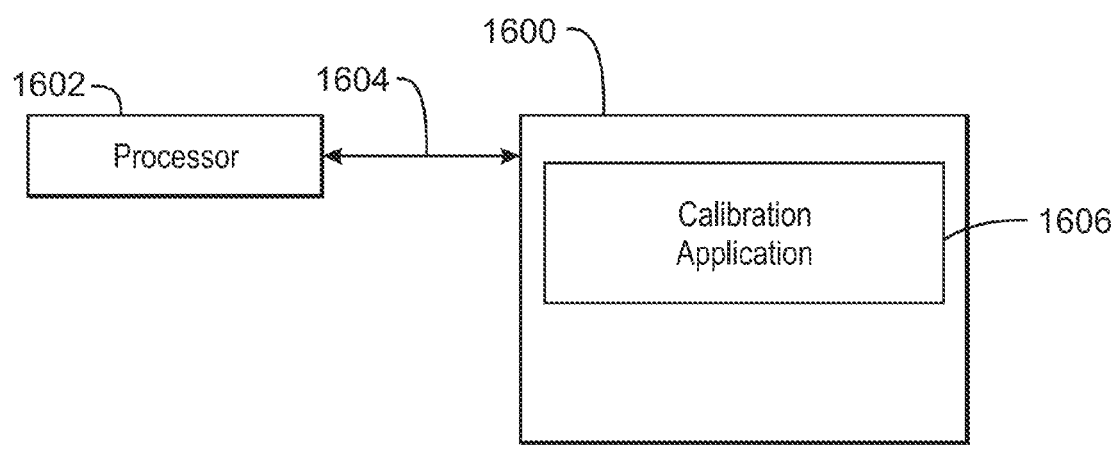
FIG. 16 is a block diagram depicting an example of a computer-readable medium configured to calibrate a multi-camera system.

FIG. 16 is a block diagram depicting an example of a computer-readable medium configured to calibrate a multi-camera system. The computer-readable medium 1600 may be accessed by a processor 1600 over a computer bus 1604. In some examples, the computer-readable medium 1600 may be a non-transitory computer-readable medium. In some examples, the computer-readable medium may be a storage medium, but not including carrier waves, signals, and the like. Furthermore, the computer-readable medium 1600 may include computer-executable instructions to direct the processor 1602 to perform the steps of the current method.

The various software components discussed herein may be stored on the tangible, non-transitory, computer-readable medium 1600, as indicated in FIG. 11. For example, a calibration application 1606 may be configured to capture one or more images at a first target, capture one or more images at a second target, capture one or more images at a third target, capture one or more images at a fourth target, and calibrate a multi-camera system based on the captured images.

The techniques described herein include factory camera calibration and an application that will automatically capture images of these targets and calibrate the images. The calibration data may be saved in a factory partition on the device being tested. The camera will be in a separate fixture (motorized rig platform) that will be pointed towards the target. The height of the camera will be such that the center of the camera array will line up with the center of each target.

Calibration method steps may include placing a tablet in a fixture aligned with the first target. The camera array is on the back of the tablet. Touch screen is facing an operator with front facing camera to the bottom right. The tablet should be inserted all the way into the fixture, and not at an angle. The surface of the tablet should be parallel to the surface of the target. The fixture will be setup so that the user does not need to adjust the tablet. A rotating rig will start and then the camera system should be used to capture images by pushing a shutter button on the display of the tablet. These actions should happen in quick succession so that the timing between rotation and camera are in sync. The next steps should happen automatically including: an image captured at target 1, jig will rotate by 45 degrees and capture an first image at the second target. The jig will rotate about 10 degrees and a second image is captured at the second target. The jig will rotate about 135 degrees to the third target and an image will be captured at the third target. The jig will rotate about 180 degrees and a first image will be captured of the fourth target. The jig will rotate about 10 degrees and a second image will be captured of the fourth target. The calibration will start after the second image of the fourth target is captured.

The device can be removed from the rotating rig while waiting for the calibration processing to complete. If calibration is successful, pull a .yml file from the factory partition for backup. If the calibration fails, run the calibration process again.

A successful calibration creates a calibration file called "factorycameracalibration.yml" in root/factory on the device. Each device may produce a unique file. No file is created if the calibration fails. The manufacturer should copy the calibration file off the device and store it on a back up server. The calibration filed may be used to further improve the calibration process. Debugging may include confirming that all cameras in the multi-camera system are showing preview when the application starts, confirming that a first target is positioned correctly in a preview window when the application is running, and confirming that the targets are in the correct position. The targets should be pointing directly at the tablet holder and at a correct distance from the tablet holder.

It may be posted to look at the captured images to see if all the images are being captured correctly. Opening a calibration debug application may allow an operator to view if the first calibration was performed. Text may be rendered in the calibration debug application that will allow the operator to open images associated with each target. In some scenarios, if the images look correct and the calibration is still failing, the images may be sent to an analysis team for further review. The images may be stored in a single tar file in the factory partition.

Camera calibration can fail for multiple reasons. Some common reasons include a failure in corner detection, a calibration numerical optimization is not converging, a front checkerboard may be too close to a camera. If a calibration failure is noticed, a calibration debug application may be included on the device, and may be used to debug the calibration process. The calibration debug application may enable an operator to rerun a calibration on the latest image set captured, and may save important debugging information. The information may be viewed by connecting the tablet to another computing device and doing an "adb pull" from the command line. The reason why calibration failed can be debugged by looking at a file in a directory of the tablet. In this file, all the warning texts are written. If calibration is not successful, an operator may see a line as "ERROR" followed by an error message.

The calibration application will fail to detect a checkerboard pattern if the camera field of view is blocked, if the amount of light on the checkerboard is skewed much more than 45 degrees, and/or if there is a blur in the image. If corner dectection is successful, blue lines on the corners of all images may be rendered, this may be ture only if the debug flag is set to true in the application.

If corner detection is unsuccessful, after running calibration again in debug mode, there should be images in the results directory. Looking at this image you can see which checkerboard the app failed to detect. The number in this file name can be 0, 1, or 3 based on the capture number. The correctly detected boards will have blue lines drawn on their inner corners and failures will not. You can also look at the FactoryCameraCalibration.log file. There should be warnings with the title "WARNING|Failed to detect pattern."

If too few images have correct corner detection, a message may be generated such as ERROR| there is too low active images during BA. Another message indicating too few images that have correct corner detection might include "ERROR| There is no useable image!"

In the case of failure, an operator may check that the checkerboard has too much light or too less light, and lighting can be adjusted. It is possible that the bottom board in a multi-board target is reflecting too much light or the top of the checkerboard has too little light. If any checkerboard is too skewed, make sure the angle is set to the correct value. In some cases, this may happen with the top/bottom checkerboard if the hinges are not tight.

Calibration optimization will not converge if there is a blur in any of the images, the jig was not stationary while capturing, the corners were not detected accurately due to lighting issues. If it fails, in a log file an operator may find the following messages at the end of the file: ERROR-|Bundle adjustment did not converge based on the settings, or Error|There is too low active images during BA. An operator may also see the following warning at the end of the file: "WARNING|Disabling view X, exceeds the error threshold," or "WARNING|View number X is not used during bundle adjustment. If an operator sees these warnings more than 3 times, that will result in an error. In the case of failure, make sure none of the images in the current capture had bad lighting or blur, capture the pictures again and proceed.

If the front checkerboard is too close to the camera, the operator may see a warning "Failed to corners on album provided for rectification shift (camera X)." After running calibration again in debug mode, you will also see an image named RectificationFailure.png in the results directory. In this case, the first checkerboard may be too close to the cameras. Assure that the checkerboard is in the center of the image from top, right, bottom, and left. If it is already in the center, move the checkerboard about 2 inches behind.

Example 1 includes a system for calibrating a multi-camera system. The system includes a processing device, and modules to be implemented by the processing device. The modules include an image capture module and a calibration module. The image capture module is configured to capture one or more images at a first target, capture one or more images at a second target, capture one or more images at a fourth target. The calibration module is to calibrate a multi-camera system based on the captured images.

At the first target, the image capture module may capture one image, and two images at the second target. The image capture module may capture one image at the third target, but two images at the second target.

Example 2 includes a method for calibrating a multi-camera system. The method includes capturing one or more images at a first target, one or more images at a second target, one or more images at a third target, and one or more images at a fourth target. The method may also include calibration of the multi-camera system based on the captured images.

In some cases, an apparatus comprising means to carry out the method of Example 2 Further, in some cases, a computer-readable medium having executable code may be executed by a processor, and may cause the processor to carry out the method of Example 2.

Example 3 includes a computer-readable medium including code, when executed, to cause a processing device to capture one or more images at a first target, capture one or more images at a second target, and capture one or more images at a fourth target. Further, the code may be configured to cause the processing device to calibrate a multi-camera system based on the captured images.

Example 4 includes an apparatus for calibrating a multi-camera system. The apparatus may include a means for capturing one or more images at a first target, one or more images at a second target, one or more images at a third target, and one or more images at a fourth target. The means may also be configured to calibrate the multi-camera system based on the captured images.

Example 5 includes an apparatus for calibrating a multi-camera system. The apparatus includes logic, at least partially comprising hardware logic. The logic is configured to capture one or more images at a first target, one or more images at a second target, one or more images at a third target, and one or more images at a fourth target. The logic may also be configured to calibrate the multi-camera system based on the captured images.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for calibrating a multi-camera system, comprising:
   a processing device; and
   modules to be implemented by the processing device, the modules comprising:
   an image capture module to:
      capture one or more images at a first target;
      capture one or more images at a second target;
      capture one or more images at a third target;
      capture one or more images at a fourth target;
   a motorized platform to receive a device housing the multi-camera system at a first position associated with the first target;
   a rotation module to:
      rotate the device about 45 degrees to a second position associated with the second target;
      rotate the device about 10 degrees to a third position associated with the second target;
      rotate the device about 135 degrees to a fourth position associated with the third target;
      rotate the device about 180 degrees to a fifth position associated with the fourth target;
      rotate the device about 10 degrees to a sixth position associated with the fourth target; and
   calibration module to calibrate a multi-camera system based on the captured images.

2. The system of claim 1, further comprising a storage device, wherein the calibration module is to store calibration data associated with the calibration.

3. The system of claim 1, wherein:
   one image is captured at the first target;
   two images are captured at the second target;
   one image is captured at the third target; and
   two images are captured at the fourth target.

4. The system of claim 1, the modules further comprising a debugging module to:
   confirm all cameras of the multi-camera system are showing a preview before calibration;
   confirm that the first target is positioned within a preview window before image capture is performed;
   confirm that all targets are pointing directly the multi-camera system at a predetermined distance from the multi-camera system; or
   any combination thereof.

5. The system of claim 1, wherein:
   the first target is a checkerboard pattern rectangle about 410 millimeters (mm) tall and about 620 mm wide;
   the second target is a checkerboard pattern rectangle about 620 mm tall and about 900 mm wide;
   the third target comprises five checkerboard pattern rectangles comprising:
      a first checkerboard pattern rectangle about 60 mm tall and 60 mm wide;
      four checkerboard pattern rectangles each attached to an edge of the first checkerboard pattern rectangle, the four checkerboard patterns disposed at an angle of about 40 degrees from each other; and
   the fourth target is similar to the third target except that the fourth target is disposed at a distance from the multi-camera system that is farther than the distance at which the third target is disposed.

6. The system of claim 5, further comprising a position determination module to capture an image of each checkerboard pattern of the third target, the fourth target, or any combination thereof.

7. The system of claim 6, wherein the position determination module is to stich individual images captured of each checkerboard pattern together based on a position of each checkerboard pattern relative to other checkerboard patterns in the target.

8. The system of claim 1, wherein a center of each of the targets and the multi-camera system are disposed about 90 centimeters (cm) above the ground.

9. The system of claim 1, wherein:
   a distance between the multi-camera system and the first target is about 800 mm;
   a distance between the multi-camera system and the second target is about 1200 mm;
   a distance between the multi-camera system and the third target is about 2230 mm; and
   a distance between the multi-camera system on the fourth target is about 3050 mm.

10. A method for calibrating a multi-camera system, comprising:
   capturing one or more images at a first target, wherein the first target is a checkerboard pattern rectangle about 410 millimeters (mm) tall and about 620 mm wide;
   capturing one or more images at a second target, wherein the second target is a checkerboard pattern rectangle about 620 mm tall and about 900 mm wide;
   capturing one or more images at a third target, wherein the third target comprises five checkerboard pattern rectangles comprising:
      a first checkerboard pattern rectangle about 60 mm tall and 60 mm wide;
      four checkerboard pattern rectangles each attached to an edge of the first checkerboard pattern rectangle, the four checkerboard patterns disposed at an angle of about 40 degrees from each other;
   capturing one or more images at a fourth target, wherein the fourth target is similar to the third target except that the fourth target is disposed at a distance from the multi-camera system that is farther than the distance at which the third target is disposed; and calibrating a multi-camera system based on the captured images.

11. The method of claim 10, further comprising a storage device, wherein the calibration module is to store calibration data associated with the calibration.

12. The method of claim 10, wherein:
one image is captured at the first target;
two images are captured at the second target;
one image is captured at the third target; and
two images are captured at the fourth target.

13. The method of claim 10, further comprising:
a motorized platform to receive a device housing the multi-camera system at a first position associated with the first target;
a rotation module to:
rotate the device about 45 degrees to a second position associated with the second target:
rotate the device about 10 degrees to a third position associated with the second target;
rotate the device about 135 degrees to a fourth position associated with the third target;
rotate the device about 180 degrees to a fifth position associated with the fourth target;
rotate the device about 10 degrees to a sixth position associated with the fourth target.

14. The method of claim 10, the modules further comprising a debugging module to:
confirm all cameras of the multi-camera system are showing a preview before calibration;
confirm that the first target is positioned within a preview window before image capture is performed;
confirm that all targets are pointing directly the multi-camera system at a predetermined distance from the multi-camera system; or
any combination thereof.

15. The method of claim 10, further comprising a position determination module to capture an image of each checkerboard pattern of the third target, the fourth target, or any combination thereof.

16. The method of claim 15, wherein the position determination module is to stich individual images captured of each checkerboard pattern together based on a position of each checkerboard pattern relative to other checkerboard patterns in the target.

17. The method of claim 10, wherein a center of each of the targets and the multi-camera system are disposed about 90 centimeters (cm) above the ground.

18. The method of claim 10, wherein:
a distance between the multi-camera system and the first target is about 800 mm;
a distance between the multi-camera system and the second target is about 1200 mm;
a distance between the multi-camera system and the third target is about 2230 mm; and
a distance between the multi-camera system on the fourth target is about 3050 mm.

19. A non-transitory computer readable medium including code, when executed, to cause a processing device to:
capture one or more images at a first target;
capture one or more images at a second target;
capture one or more images at a third target;
capture one or more images at a fourth target; and
calibrate a multi-camera system based on the captured images, wherein the code is to confirm all cameras of the multi-camera system are showing a preview before calibration, confirm that the first target is positioned within a preview window before image capture is performed, confirm that all targets are pointing directly the multi-camera system at a predetermined distance from the multi-camera system, or any combination thereof.

20. The computer readable medium of claim 19, further comprising code to store calibration data associated with the calibration.

21. The computer readable medium of claim 19, wherein:
one image is captured at the first target;
two images are captured at the second target;
one image is captured at the third target; and
two images are captured at the fourth target.

22. The computer readable medium of claim 19, further comprising code to:
rotate the device about 45 degrees from a first position associated with the first target to a second position associated with the second target:
rotate the device about 10 degrees to a third position associated with the second target;
rotate the device about 135 degrees to a fourth position associated with the third target;
rotate the device about 180 degrees to a fifth position associated with the fourth target;
rotate the device about 10 degrees to a sixth position associated with the fourth target.

* * * * *